(12) United States Patent
Freyermuth et al.

(10) Patent No.: US 8,899,891 B2
(45) Date of Patent: Dec. 2, 2014

(54) TOOL HOLDER SUCH AS A BORING HEAD, A CHUCK, OR A MILLING CUTTING ARBOR INTEGRATING A DAMPING DEVICE

(75) Inventors: Alain Freyermuth, Pfaffenhoffen (FR); Mathieu Ostermann, Allenwiller (FR); Cédric Roos, Neuwiller les Saverne (FR)

(73) Assignee: SECO-E.P.B., Bouxwiller (FR)

( * ) Notice: Subject to any disclaimer, the term of this patent is extended or adjusted under 35 U.S.C. 154(b) by 692 days.

(21) Appl. No.: 13/170,440

(22) Filed: Jun. 28, 2011

(65) Prior Publication Data
US 2011/0318130 A1 Dec. 29, 2011

(30) Foreign Application Priority Data
Jun. 28, 2010 (FR) ..................... 10 55168

(51) Int. Cl.
| | |
|---|---|
| *B23C 5/00* | (2006.01) |
| *B23Q 11/10* | (2006.01) |
| *B23B 27/00* | (2006.01) |
| *B23B 31/117* | (2006.01) |
| *B23B 29/02* | (2006.01) |

(52) U.S. Cl.
CPC ............. *B23B 29/022* (2013.01); *B23B 27/002* (2013.01); *B23C 5/003* (2013.01); *B23Q 11/10* (2013.01); *B23B 2250/12* (2013.01); *B23B 31/1179* (2013.01); *B23C 5/00* (2013.01)
USPC ............... 409/234; 408/56; 408/143; 279/20

(58) Field of Classification Search
CPC ............... B23C 5/003; B23Q 11/0032; B23Q 11/0035; B23Q 11/0039
USPC ............... 409/141, 234; 408/143, 56; 279/20, 279/102, 103, 157
See application file for complete search history.

(56) References Cited

U.S. PATENT DOCUMENTS 3,447,402 A 6/1969 Ray
3,774,730 A * 11/1973 Maddux ........................ 188/379
(Continued)

FOREIGN PATENT DOCUMENTS

EP 108782 A * 5/1984 ............. B23B 31/02
EP 0 571 490 12/1993
(Continued)

OTHER PUBLICATIONS

EPO English Machine Translation of FR 2929868—Ostermann et al., "Tool-holder Equipped with Shock-Absorbing Means," Oct. 16, 2009.*
French Search Report dated Feb. 10, 2011; Corresponding to the Priority Application.

*Primary Examiner* — Daniel Howell
*Assistant Examiner* — Michael Vitale
(74) *Attorney, Agent, or Firm* — Young & Thompson

(57) ABSTRACT

A damping tool holder, such as a boring head, a chuck, or a milling cutting arbor, integrates a damping device (2), in the form of an elongated body. The damping device (2) is housed in a mounting body (3), connected by one end to the tool-holder body (1) and having at its other end an end fitting (4) for mounting a tool, whereby the mounting body (3) is equipped with at least one lubricant feed pipe (32), emptying at its front end into the end fitting (4) for mounting a tool and connected at its other end to a circular groove (102) for distributing lubricant that is provided on the front surface of the tool holder (1).

18 Claims, 3 Drawing Sheets

(56) References Cited

U.S. PATENT DOCUMENTS

| | | | |
|---|---|---|---|
| 3,838,936 A | 10/1974 | Andreassen et al. | |
| 4,364,292 A * | 12/1982 | Wozniak et al. | 83/605 |
| 4,795,292 A * | 1/1989 | Dye | 409/136 |
| 5,413,318 A | 5/1995 | Andreassen | |
| 5,700,116 A | 12/1997 | Cobb, Jr. | |
| 6,443,673 B1 | 9/2002 | Etling et al. | |
| 6,705,805 B2 * | 3/2004 | Lagerberg | 407/11 |
| 2006/0230890 A1 | 10/2006 | Little | |
| 2009/0003947 A1 | 1/2009 | Haimer | |
| 2009/0257838 A1 | 10/2009 | Ostermann et al. | |

FOREIGN PATENT DOCUMENTS

| | | | |
|---|---|---|---|
| EP | 1 248 692 | 9/2004 | |
| FR | 2 173 957 | 10/1973 | |
| FR | 2 239 313 | 2/1975 | |
| FR | 2 929 868 | 10/2009 | |
| GB | 1 578 343 | 11/1980 | |
| JP | 57149108 A * | 9/1982 | B23B 31/00 |
| WO | WO 2008002145 A1 * | 1/2008 | B23B 29/02 |
| WO | 2008/105664 | 9/2008 | |

\* cited by examiner

TOOL HOLDER SUCH AS A BORING HEAD, A CHUCK, OR A MILLING CUTTING ARBOR INTEGRATING A DAMPING DEVICE

BACKGROUND OF THE INVENTION

This invention relates to the field of numerically-controlled machine tool accessories, machining centers, and flexible cells and workshops, and it has as its object a damping means for tool holders, such as a boring head, a chuck or a milling cutting arbor.

The tool holders have a tendency, from the very fact of their composition, to vibrate, which is detrimental to their proper operation. This tendency to vibrate is all the more significant since the actual operating speeds of the machine tools are increasing constantly.

To prevent these drawbacks, it was proposed to equip the tool holders with a device for damping oscillations, making possible an adaptation of their rigidity to the operating conditions.

For this purpose, such a device that essentially consists of a damping mass mounted in an axial housing and clamped in the latter between elastically deformable masses, with the adjustment of the stiffness being done by means of a spring-loaded stop means, where the setting of this spring itself can be regulated by means of a screw device, is currently known in particular from U.S. Pat. No. 3,447,402.

Furthermore, an adjustable shock absorber for machine tools that consists of a damping element placed in an axial hole of a tool holder shaft and connected to this shaft by means of annular elastic elements, mounted on conical ends of the damping element and able to be compressed on said ends so as to regulate the rigidity, is known from FR-A-2 173 957.

DESCRIPTION OF THE RELATED ART

EP-A-0 571 490 describes another damping device that consists of a central cylindrical support, housed in the body of the tool holder and on which a damping body is mounted. This damping body is connected to the central cylindrical support by means of elastic elements that are placed in the ends of the damping body and held by means of washers that are connected to the central support. A similar device is described in EP-A-1 248 692.

In all of these known devices, holding the damping element in the axial hole is carried out by action on the ends of the element by means of elastically deformable elements; this is accomplished, however, only by action on said ends without contact between said elastically deformable elements and the generatrix of the damping element (U.S. Pat. No. 3,447,402 and FR-A-2 173 957). The two documents that describe the use of a central cylindrical support no longer provide contact of the generatrix of the damping element with an elastically deformable element that would be in contact, furthermore, with the housing of the damping element.

The result is that the action on the rigidity of a shaft equipped with such a damping element is only possible by the ends, in such a way that the damping is better carried out in an axial manner and therefore cannot be optimal.

A tool holder that is equipped with a damping means in the form of an elongated body arranged in a tool-holder end housing, with corresponding shape and size, and closed at its end by a body for accommodating a boring head or a milling cutting arbor, in which the damping means is of the type only with radial absorption and is equipped with at least one elastically deformable means, at least close to each end, whereby said elastically deformable means extend between the casing of the damping means and the wall of the housing of the tool holder by being clamped between the housing wall and the damping means, with the ends of the damping means extending into the housing with no constraint, was also proposed by FR-A-2 929 868.

The damping means according to this last application, whose movement is performed exclusively in the radial direction, makes it possible to cancel out the vibrating effects due to shearing forces and to machining speeds, while having a simple design and implementation. In addition, this damping means does not require any additional element or process of specific adjustment and can be implemented on all types of tool holders.

In the case of implementing a tool holder that has a long length relative to its diameter and that carries a tool of small diameter, however, a problem of positioning the damping means as close as possible to the cutting tool is posed, with this cutting tool generally having to be mounted at the end of such a tool holder of small diameter. Actually, in such a case, the damping means that is usually implemented is positioned at a distance that is relatively significant from the plane of the active part of the tool, because of an impossibility of mounting at the level of the tool, in such a way that its effectiveness is clearly less than in use with a standard tool holder.

In addition, the tools of small diameter, mounted on these tool holders, are generally attached by clamping, i.e., by preliminary heating, in such a way that a problem of transmitting heat to upstream elements and in particular to the damping means is posed, which has parts that are sensitive to high temperatures and that can therefore degrade, thus making the damping means inoperative.

SUMMARY OF THE INVENTION

This invention has as its object to overcome these drawbacks by proposing a damping means for tool holders, such as a boring head, a chuck or a milling cutting arbor, making it possible to cancel out the vibrating effects due to shearing forces and to machining speeds, close to the cutting tools and adaptable to tool holders of different lengths. In addition, this damping means can be equipped with a device for protection against excessive temperature.

For this purpose, the damping means for tool holders, such as a boring head, a chuck or a milling cutting arbor, which is in the form of an elongated body, is characterized in that it is housed in a mounting body, connected by one end to a tool-holder body and having at its other end an end fitting for mounting a tool.

BRIEF DESCRIPTION OF THE DRAWING FIGURES

The invention will be better understood owing to the description below, which relates to preferred embodiments, provided by way of nonlimiting examples and explained with reference to the accompanying diagrammatic drawings, in which.

Figure 3:
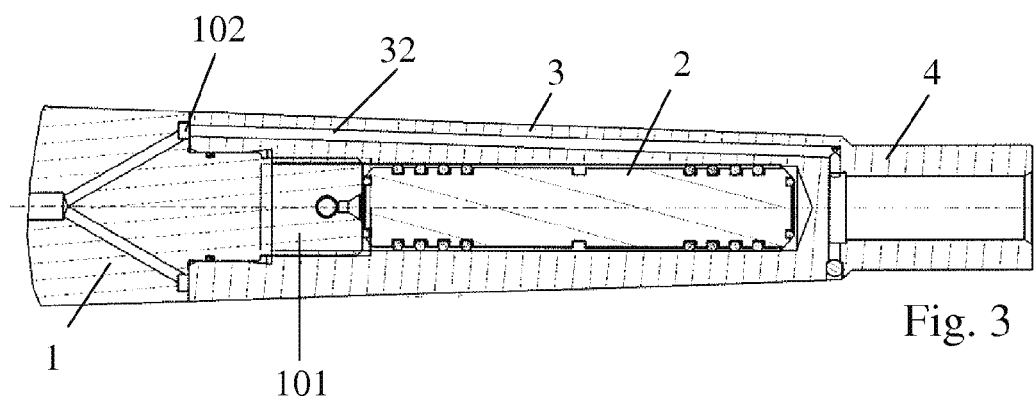
FIG. 3 is a view that is analogous to that of FIG. 2 of a first variant embodiment of the invention, whereby the damping means is equipped with an end fitting for mounting by clamping or shrinking.
Figure 4:
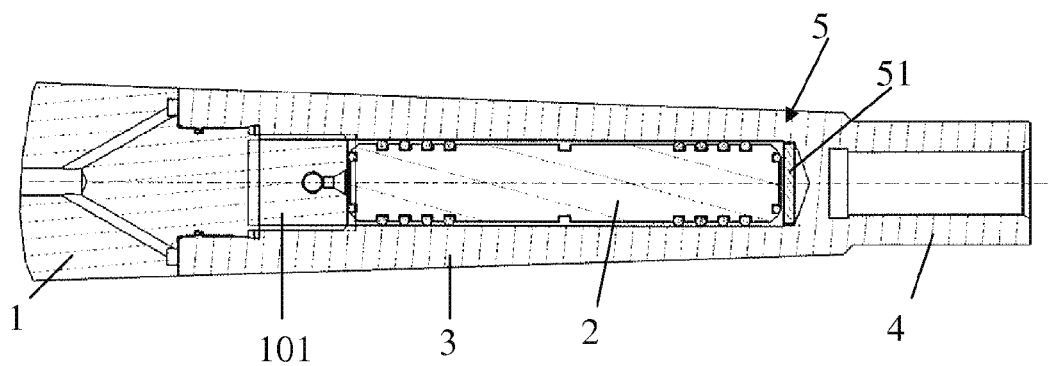
FIG. 4 is a view that is analogous to that of FIG. 3, whereby the damping means is also equipped with a device for preventing excessive heating.
Figure 5:
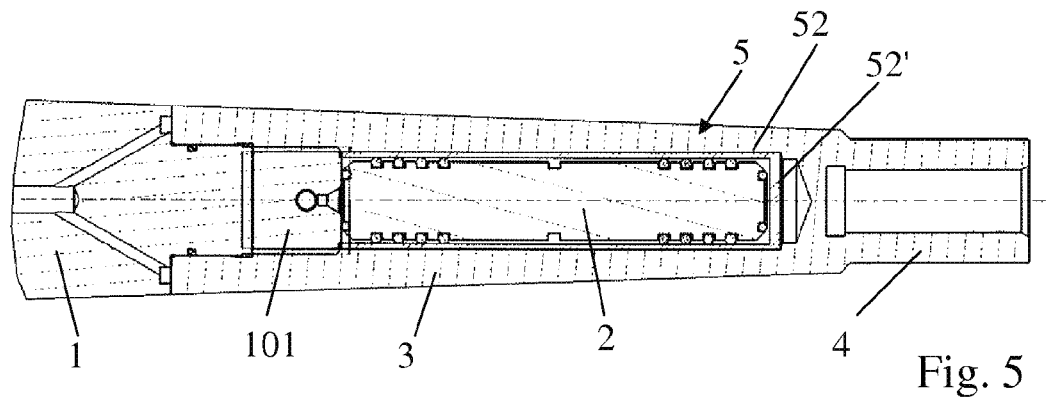
Figure 6:
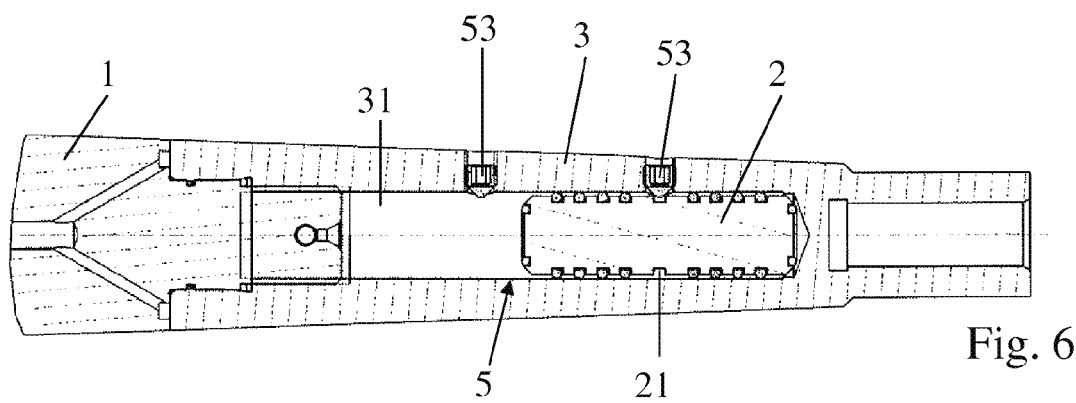
Figure 7:
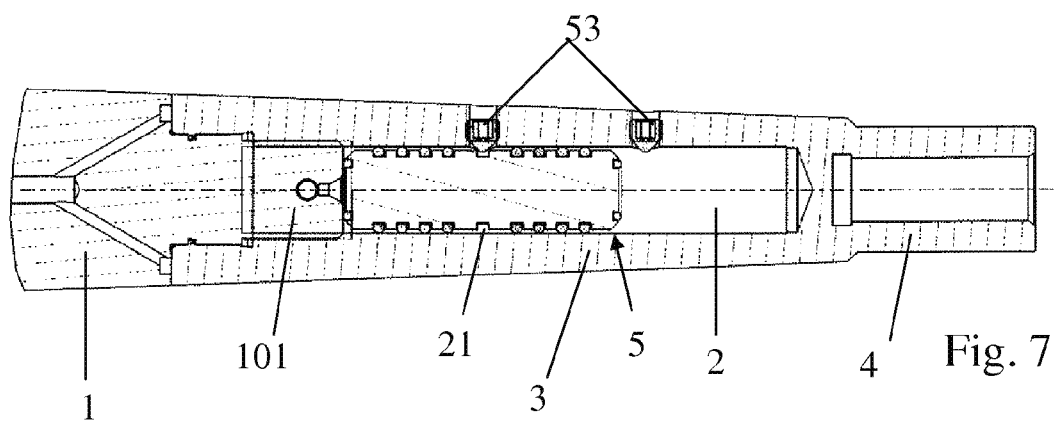
Figure 8:
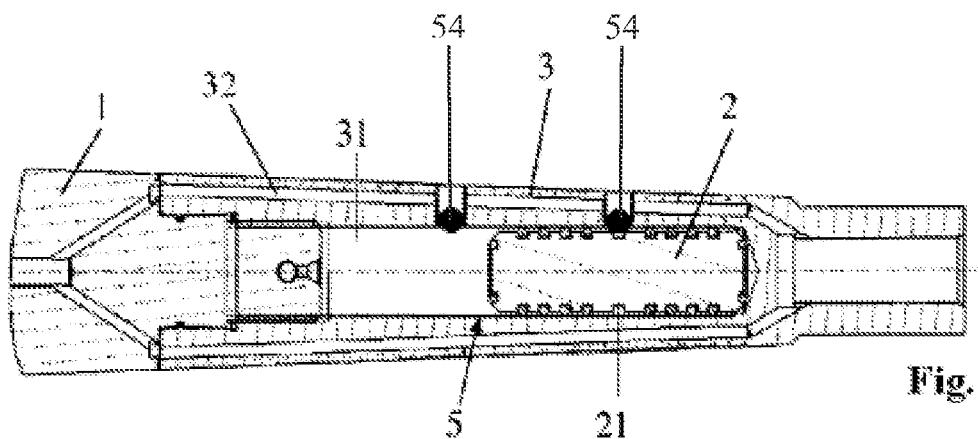
Figure 9:
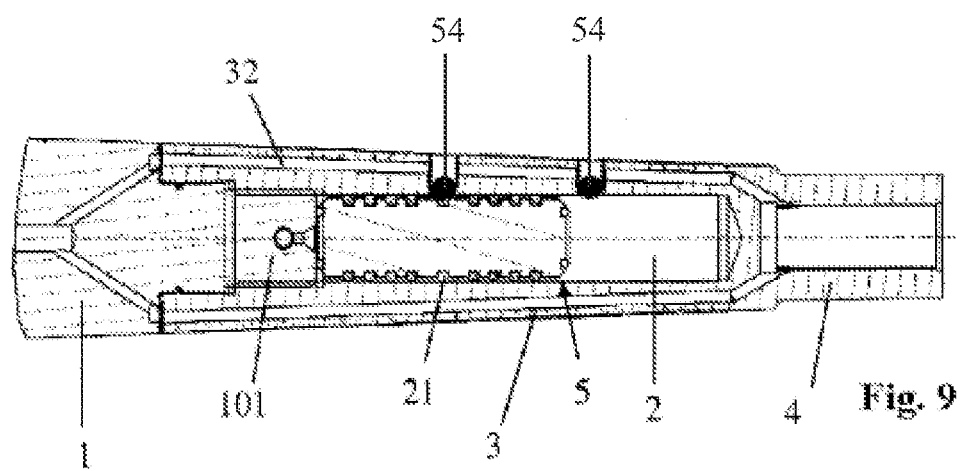

FIG. 5 is a view that is analogous to those of FIGS. 3 and 4 that show a variant embodiment of the damping means of FIG. 4, FIGS. 6 and 7 are views that are analogous to those of FIGS. 3 to 5 of another variant embodiment of the damping means of FIG. 4, respectively in an operating position after clamping a tool and in a position for preventing excessive heating during clamping, and FIGS. 8 and 9 are further view showing further features.

DETAILED DESCRIPTION OF THE INVENTION

FIGS. 1 to 7 of the accompanying drawings show, by way of examples, a tool holder in the form of a boring head 1, which is equipped with a damping means 2 in the form of an elongated body.

According to the invention, the damping means 2 is housed in a mounting body 3, connected by one end to a tool-holder body 1 and having at its other end an end fitting 4 for mounting a tool.

As the figures of the accompanying drawings show, the mounting body 3 has a housing 31 for accommodating the damping means 2 and is connected to the front end of the tool-holder body 1 by screwing or by force-fitting on an end fitting 101 of the latter. Preferably, the mounting body 3 comes in the form of a receptacle with thin walls. Thus, the mounting body 3 makes possible an adaption to a tool of small diameter and therefore, in particular, a possibility for implementing a tool of small diameter at the end of a tool holder of long length, for example for the production of bores of small diameter and significant length.

In the embodiments shown in FIGS. 1 to 7, the closing of the housing 31 of the damping means 2 is achieved by direct screwing or by force-fitting of the end fitting 101 in the end of the housing 31.

However, it is also possible, according to a variant embodiment of the invention that is not shown in the accompanying drawings, to mount the damping means 2 through the end fitting 4 for mounting a tool, whereby the housing 31 is then closed by a plug that is inserted into said end fitting 4.

Figure 1:
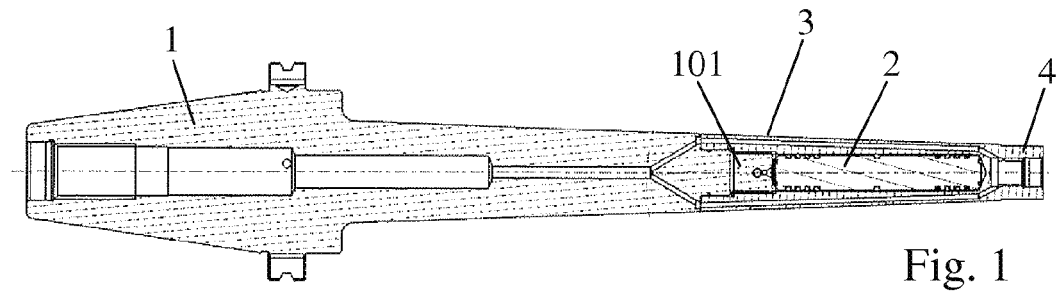
FIG. 1 is a cutaway view of a tool holder that is equipped with a damping means according to the invention.
Figure 2:
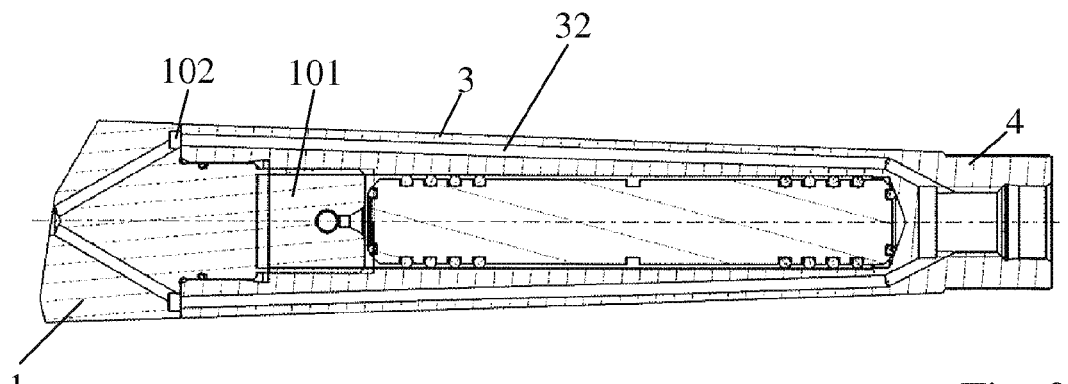
FIG. 2 is a partial cutaway view on a larger scale of the damping means.

Furthermore, as FIGS. 1 to 3 of the accompanying drawings show, the mounting body 3 can advantageously be equipped with at least one lubricant feed pipe 32, emptying at its front end into the end fitting 4 for mounting a tool and connected at its other end to a circular groove 102 for distributing lubricant that is provided on the front surface of the tool holder 1.

Thanks to the mounting body 3, it is possible to produce long tool holders that are of small diameter relative to their length and that make possible the mounting of boring or milling tools of small diameter, while ensuring an elimination of vibrating effects due to the cutting forces and to machining speeds, as close as possible to the cutting tools. Actually, the damping is carried out by means of the mounting body that is adaptable on different tool holders and that directly receives the cutting tool on its mounting end fitting 4.

According to another characteristic of the invention, in the case of the implementation of an end fitting 4 for mounting a tool by clamping, the mounting body 3 can advantageously be equipped, in addition, with a device 5 for preventing excessive heating of the damping means 2 (FIGS. 4 to 7).

According to a first embodiment, shown in FIG. 4 of the accompanying drawings, the device 5 for preventing excessive heating of the damping means 2 advantageously consists of a heat-insulating buffer 51 that extends in front of the end of the damping means 2 from the side of the latter located as close as possible to the mounting end fitting 4. Such a heat-insulating buffer 51 can consist of any material that has a high insulation coefficient, namely, for example, based on glass fibers that are immersed in a resin or else based on mica and resin. Thus, during heating, for the purpose of clamping the tool previously centered on the mounting end fitting 4, a relatively significant portion of the released heat is transmitted to said mounting end fitting 4 and by the latter to the entire mounting body 3, in such a way that heating of the housing 31 of the damping means 2 also takes place.

The provision of the heat-insulating buffer 51 that forms the device 5 makes it possible to insulate said housing 31 against the heat that comes directly from the mounting end fitting 4 and more particularly the heat in the form of very hot air that is found in the central hole 41 of said mounting end fitting 4.

It follows that the elements of the damping means 2, namely the elastically deformable parts that are used for damping, are protected against excessive heating.

FIG. 5 of the accompanying drawings shows a variant embodiment in which the device 5 for preventing excessive heating of the damping means 2 consists of a receptacle 52 for housing the damping means 2, whereby this receptacle is inserted into the housing 31 of the tool holder 1 and is closed by a wall 52' at least on one side rotated toward the mounting end fitting 4.

In this embodiment, the receptacle 52 is also advantageously made of a material with a high heat-insulating power.

FIGS. 6 and 7 of the accompanying drawings show a second variant embodiment, in which the device 5 for preventing excessive heating of the damping means 2 essentially consists of the provision of a housing 31 of the damping means 2 of a length that is greater than the length of said damping means 2, whereby the prevention of excessive heating is implemented by moving the damping means 2 from one operating position (FIG. 6), in which the damping means 2 is placed and is held at one end of the housing 31, as close as possible to the mounting end fitting 4, to a position for preventing the heating, in which the damping means 2 is placed and is held at the opposite end of the housing 31.

Holding the damping means 2 in its two end positions can be ensured by means of two pressure screws 53 that work or cooperate, each in one of the positions of the damping means 2, with a circular median groove 21 of said damping means 2.

This holding of the damping means 2 in its two end positions can also be ensured by a device with two retractable balls 54 that work or cooperate—each in one of the positions of the damping means 2—with the circular median groove 21 of said damping means 2. Such a device is shown in FIGS. 8-9 with the two retractable balls 54 being shown schematically.

Thanks to the invention, it is possible to produce a damping means for tool holders, such as a boring head, a chuck or a milling cutting arbor, that can be used on all types of tool holders, in particular long tool holders of small diameter relative to their length, and making possible the mounting of boring or milling tools of small diameter, by clamping, while preserving the fragile parts of the damping means 2, in particular the elastically deformable elements, from deterioration due to the heat that is released during the clamping.

Of course, the invention is not limited to the embodiments that are described and shown in the accompanying drawings. Modifications are possible, in particular from the standpoint of the composition of the various elements or by substitution of equivalent techniques, without thereby exceeding the field of protection of the invention.

The invention claimed is:

1. A Tool holder, comprising:
   a mounting body (3);
   a tool-holder body (1) located at a first end of the mounting body (3);
   a circular groove (102) for distributing lubricant provided on a front surface of the tool holder body (1);
   a first end fitting (4) for mounting a tool located at an opposite, second end of the mounting body (3);
   a damping means (2), in the form of an elongated body, wherein the damping means (2) is housed in the mounting body (3); and
   at least one lubricant feed pipe (32) located within the mounting body (3), the at least one lubricant feed pipe (32) having i) a front first end that empties into the first end fitting (4) for mounting a tool and ii) an opposite, second end connected to the circular groove (102) for distributing lubricant that is provided on the front surface of the tool holder (1).

2. Tool holder according to claim 1, wherein the mounting body (3) has a housing (31) for accommodating the damping means (2), the housing having a front end that is connected to the front end of the tool-holder body (1) by screwing or by force-fitting a second end fitting (101).

3. Tool holder according to claim 2, wherein the closing of the housing (31) of the damping means (2) is implemented by direct screwing or by force-fitting of the second end fitting (101) in the front end of the housing (31).

4. Tool holder according to claim 3, wherein in the case of implementing said first end fitting (4) for mounting a tool by clamping, the mounting body (3) is also equipped with a device (5) for preventing excessive heating of the damping means (2).

5. Tool holder according to claim 2, wherein the mounting body (3) comes in the form of a receptacle with thin walls.

6. Tool holder according to claim 2, wherein in the case of implementing said first end fitting (4) for mounting a tool by clamping, the mounting body (3) is also equipped with a device (5) for preventing excessive heating of the damping means (2).

7. Tool holder according to claim 1, wherein the mounting body (3) comes in the form of a receptacle with thin walls.

8. Tool holder according to claim 7, wherein in the case of implementing said first end fitting (4) for mounting a tool by clamping, the mounting body (3) is also equipped with a device (5) for preventing excessive heating of the damping means (2).

9. Tool holder according to claim 1, wherein in the case of implementing said first end fitting (4) for mounting a tool by clamping, the mounting body (3) is also equipped with a device (5) for preventing excessive heating of the damping means (2).

10. Tool holder according to claim 9, wherein the device (5) for preventing excessive heating of the damping means (2) consists of a heat-insulating buffer (51) that extends in front of the end of the damping means (2) from the side of the latter located close to the first end fitting (4).

11. Tool holder according to claim 9, wherein the device (5) for preventing excessive heating of the damping means (2) consists of a receptacle (52) for housing the damping means (2), whereby this receptacle is inserted into the housing (31) of the tool holder (1) and is closed by a wall (52') at least on one side rotated toward the first end fitting (4).

12. Tool holder according to claim 9, wherein the device (5) for preventing excessive heating of the damping means (2) essentially consists of the provision of a housing (31) of the damping means (2) of a length that is greater than the length of said damping means (2), with the prevention of excessive heating being implemented by a movement of the damping means (2) from an operating position, in which the damping means (2) is placed and is held at one end of the housing (31), as close as possible to the first end fitting (4), to a position for preventing heating, in which the damping means (2) is placed and is held at the opposite end of the housing (31).

13. Tool holder according to claim 12, wherein holding the damping means (2) in its two end positions is ensured by means of two pressure screws (53) that work—each in one of the positions of the damping means (2)—with a circular median groove (21) of said damping means (2).

14. Tool holder according to claim 12, wherein the holding of the damping means (2) in its two end positions is ensured by a device with two retractable balls that work—each in one of the positions of the damping means (2)—with a circular median groove (21) of said damping means (2).

15. A Tool holder, comprising:
   a mounting body (3);
   a tool-holder body (1) located at a first end of the mounting body (3);
   a circular groove (102) for distributing lubricant provided on a front surface of the tool holder body (1);
   a first end fitting (4) for mounting a tool located at an opposite, second end of the mounting body (3);
   a damping means (2), in the form of an elongated body, wherein the damping device (2) is housed in the mounting body (3);
   a lubricant feed pipe (32) located within the mounting body (3), said lubricant feed pipe (32) having i) a front first end that empties into the first end fitting (4) for mounting a tool and ii) an opposite, second end connected to the circular groove (102) for distributing lubricant that is provided on the front surface of the tool holder (1);
   a housing (31) accommodating the damping means (2), the housing having a front end that is connected to the front end of the tool-holder body (1), said housing (31) having a length that is greater than a length of said damping means (2); and
   a device (5) for preventing excessive heating of the damping means (2) providing movement of the damping means (2) from i) a first, operating position in which the damping means (2) is placed and is held at a first end of the housing (31) nearest the first end fitting (4), and ii) a second position in which the damping means (2) is placed and is held at an opposite, second end of the housing (31) nearest the tool-holder body (1).

16. Tool holder of claim 15, wherein,
   the damping means (2) comprises a circular median groove (21),
   the device (5) for preventing excessive heating of the damping means (2) comprises two pressure screws (53),
   a first of said two pressure screws (53) engages the circular median groove to hold the damping means (2) in the first, operating position in which the damping means (2) is placed and is held at the first end of the housing (31), and
   a second of said two pressure screws (53) engages the circular median groove to hold the damping means (2) in the second position in which the damping means (2) is placed and is held at the opposite, second end of the housing (31).

17. Tool holder of claim 15, wherein,
   the damping means (2) comprises a circular median groove (21),
   the device (5) for preventing excessive heating of the damping means (2) comprises two retaining elements, a first of said two retaining elements engages the circular median groove to hold the damping means (2) in the first, operating position in which the damping means (2) is placed and is held at the first end of the housing (31), and a second of said two retaining elements engages the circular median groove to hold the damping means (2) in the second position in which the damping means (2) is placed and is held at the opposite, second end of the housing (31).

18. Tool holder of claim 17, wherein,
said two retaining elements comprise two retractable balls.

* * * * *